(12) United States Patent
Tanada et al.

(10) Patent No.: US 8,103,315 B2
(45) Date of Patent: Jan. 24, 2012

(54) PORTABLE TERMINAL DEVICE

(75) Inventors: Tosaku Tanada, Kunitachi (JP); Toshiya Tamura, Kokubunji (JP)

(73) Assignee: Fuijtsu Toshiba Mobile Communications Limited, Kawasaki (JP)

( * ) Notice: Subject to any disclaimer, the term of this patent is extended or adjusted under 35 U.S.C. 154(b) by 0 days.

(21) Appl. No.: 12/986,682

(22) Filed: Jan. 7, 2011

(65) Prior Publication Data

US 2011/0098002 A1 Apr. 28, 2011

Related U.S. Application Data

(63) Continuation of application No. 11/827,477, filed on Jul. 12, 2007, now Pat. No. 7,890,147.

(30) Foreign Application Priority Data

Jan. 31, 2007 (JP) ................................. 2007-021148

(51) Int. Cl.
*H04M 1/00* (2006.01)

(52) U.S. Cl. .................. 455/569.1; 455/41.1; 455/41.2; 455/41.3; 455/567; 455/569.2; 379/370; 379/252; 379/274.01; 379/374.02; 379/374.03; 381/74; 381/370

(58) Field of Classification Search ........ 455/41.1–41.3, 455/567, 569.1–569.2, 575.2, 276.6; 379/370, 379/164, 418, 252, 373.01–373.04, 374.01–374.02, 379/420.01–420.02; 381/74, 370–373

See application file for complete search history.

(56) References Cited

U.S. PATENT DOCUMENTS

| | | | |
|---|---|---|---|
| 7,072,686 B1 | 7/2006 | Schrager | |
| 2005/0286713 A1* | 12/2005 | Gunn et al. | ............... 379/406.04 |
| 2006/0019713 A1 | 1/2006 | Rokusek et al. | |
| 2006/0258408 A1 | 11/2006 | Tuomela et al. | |
| 2006/0271968 A1 | 11/2006 | Zellner | |
| 2007/0142942 A1 | 6/2007 | Hyatt | |

FOREIGN PATENT DOCUMENTS

| | | |
|---|---|---|
| JP | 2006-041702 A | 2/2006 |
| JP | 2006-319572 A | 11/2006 |

* cited by examiner

*Primary Examiner* — Wayne Cai

(74) *Attorney, Agent, or Firm* — Maschoff Gilmore & Israelsen

(57) ABSTRACT

A portable terminal device, which closes AV incoming call notification sound ringing at a headset when incoming call notification sound ringing processing through an AV profile competes with incoming call notification sound processing through a hands-free profile between a cellular phone and a headset, and when an in-band notification mode is set at the cellular phone, connects a sound link to perform communication through the hands-free profile, and starts ringing of an incoming call notification sound through the hands-free profile.

7 Claims, 9 Drawing Sheets

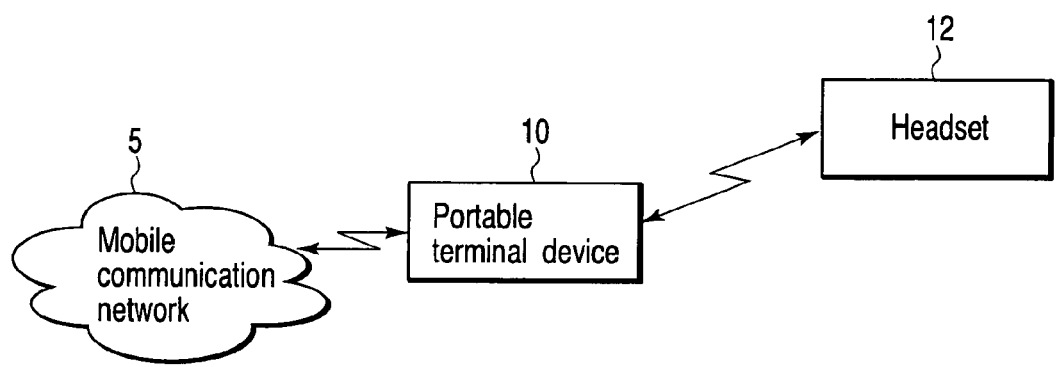
F I G. 1

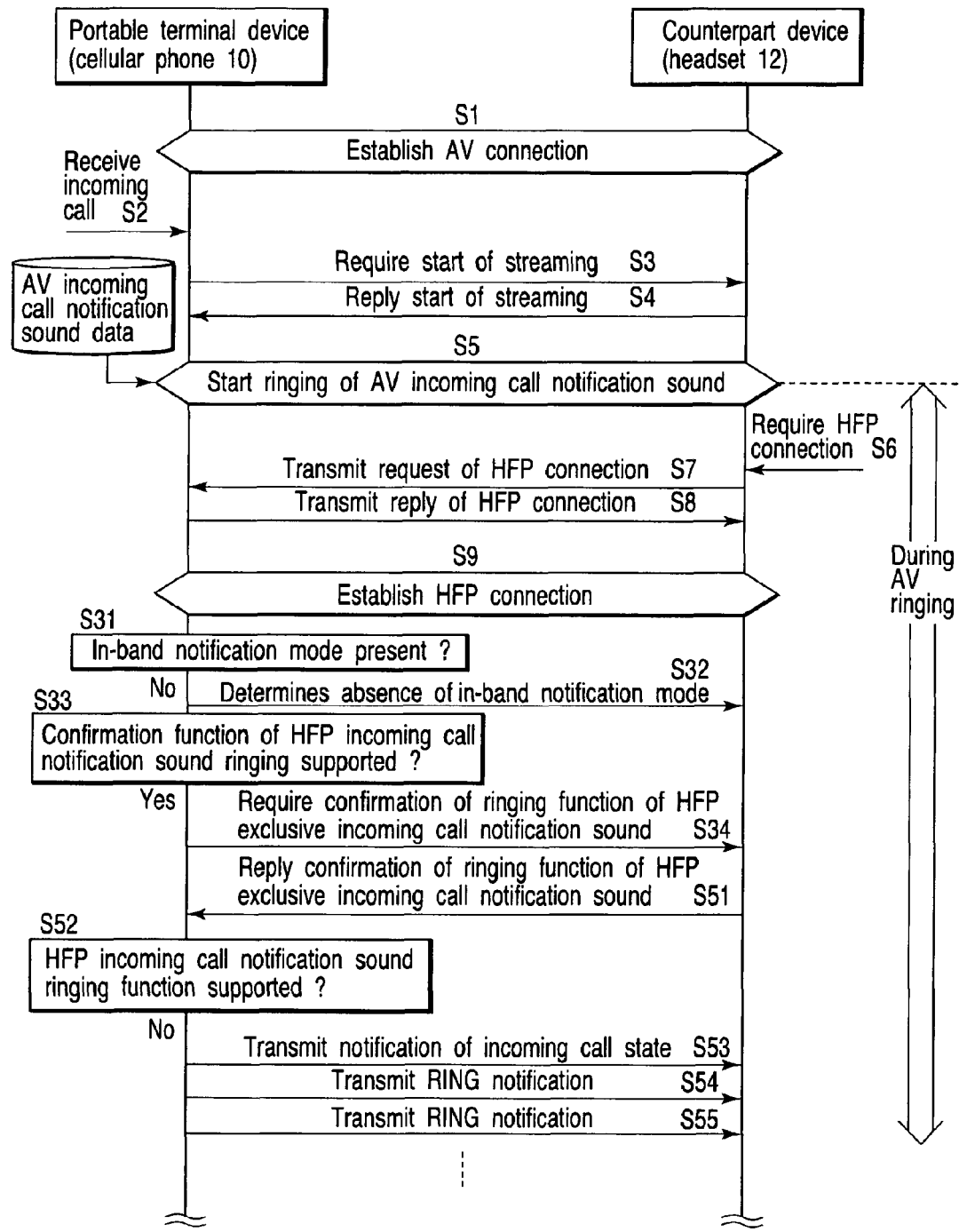
F I G. 5

PORTABLE TERMINAL DEVICE

CROSS-REFERENCE TO RELATED APPLICATIONS

This application is based upon and claims the benefit of priority from prior Japanese Patent Application No. 2007-021148, filed Jan. 31, 2007, the entire contents of which are incorporated herein by reference.

BACKGROUND OF THE INVENTION

1. Field of the Invention

The present invention relates to a portable terminal device such as a cellular phone.

2. Description of the Related Art

In recent years, a portable terminal device, such as a cellular phone capable of reproducing content of music (hereinafter, referred to as music content), has been widely used. For reproducing the music content by such a cellular phone, the sound of the music content is usually output from output equipment such as headphones.

As to the output equipment, other than headphones to be connected to the cellular phone through a cable, an external remote device, for example, a headphone set, etc., has been used. Like this, in the case of the use of the external remote device as the output equipment, the music content to be reproduced is transmitted from the cellular phone to the external remote device through short-range radio communication. Therefore, not having to connect the cellular phone and the external remote device through the cable, the cellular phone is highly convenient for its user.

Meanwhile, as a technique related to such a cellular phone, for instance, the following technique has been disclosed by JP-A 2006-41702 (KOKAI). That is, according to the technique disclosed by JP-A 200641702 (KOKAI), in the state in which the cellular phone transmits the music content to the external remote device and also the external device continuously receives the music content, the cellular phone also can transmit output information other than the relevant music content to the external remote device and also the external device can output the output information.

In other words, for example, when the cellular phone is called during the reproduction of the music content, the technique described in the foregoing patent document, JP-A 2006-41702 (KOKAI), uses a communication protocol both as a communication protocol for use in transmission/reception of the music content and a communication protocol for remote control possible to be processed in parallel then transmits incoming call notification to the external remote device.

By the way, when, e.g., an AV profile transmits incoming call notification sound data from the cellular phone to the external remote device, such as a headset, and when the incoming call notification sound by the AV profile rings at the external remote device, it is fully possible to suppose the situation in which the user of the corresponding cellular phone requires the connection by means of a hands free profile (HFP) and, as a result, the incoming call notification sound processing through the AV profile competes with that through the HFP. In such a case, it is possible to pose any malfunction.

Herein, the AV profile is a profile to transmit or receive an audio stream signal (content reproduction signal) generated from the data of an audio content. The HFP is a profile which operates an external remote device possible to perform communication with a cellular phone to perform call outgoing or incoming processing, and allows making communication from the external remote device under a hands-free state.

However, the processing in the case in which such an incoming call notification sound process through the AV profile and that through the HFP compete with each other has not been suggested and not been disclosed as well in JP-A 2006-41702 (KOKAI).

BRIEF SUMMARY OF THE INVENTION

The present invention is made in view of the foregoing situation, and an object of the invention is to provide a portable terminal device with optimum incoming call notification sound ringing process defined therein so as not to pose any malfunction between the portable terminal device, such as a cellular phone, and an external remote device, such as a headset, in the case in which an incoming call notification sound ringing process through the AV file and the process through the HFP compete with each other.

According to an aspect of the present invention, a portable terminal device is provided which comprises: a short-range radio communication unit to communicate with a remote device via a radio link directly; an incoming call notification sound data storage unit to store sound data that is audio data for notifying that an incoming call is received; a hands-free function control unit to control a control link and a voice link with the remote device via the short-range radio communication unit; an audio function control unit to control an audio link with the remote device; and an in-band setting determination unit to determine whether or not an in-band notification mode, which designates that the sound data is transmitted via the voice link to the remote device when the incoming call is received, is set, wherein, when transmitting the sound data by the hands-free function control and the audio function control compete with each other, and the in-band setting determination unit determines that the in-band notification mode is set, the audio function control unit performs control not to transmit the sound data via the audio link; and the hands-free function control unit performs control to connect the voice link and performs control to transmit the sound data via the voice link to the remote device.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

FIG. 1 is an exemplary block diagram depicting a configuration of a system in an embodiment of the present invention;

FIG. 5 is an exemplary view depicting a sequence of processing in the case in which a function to ring an HFP incoming call notification sound is not supported by a headset;

DETAILED DESCRIPTION OF THE INVENTION

The following will describe a cellular phone regarding an embodiment of the present invention with reference to the drawings.

FIG. 1 is a block diagram illustrating a configuration of a system in the embodiment of the invention. In FIG. 1, it is presumed that a cellular phone 10 that is a portable terminal acts as a server terminal to provide a service and it is supposed that, for example, a headset 12, which is a counterpart device capable of radio-communicating with the cellular phone 10, requires provision of a service to the cellular phone 10.

As to the service provided from the cellular phone 10, for instance, a hands-free service is available. Being provided such a hands-free service enables the headset 12 to perform communication, through a cellular phone 10, with a partner to be connected by means of the cellular phone 10 via a communication network.

The cellular phone 10 is composed as, for example, a cellular phone set, and it has a function of making a radio communication to and from a base station (not shown) accommodated in a mobile communication network 5. The cellular phone 10 also has a function to perform short-range radio communication in accordance with a standard, e.g., Bluetooth (registered trademark) to and from the headset 12.

Figure 2:
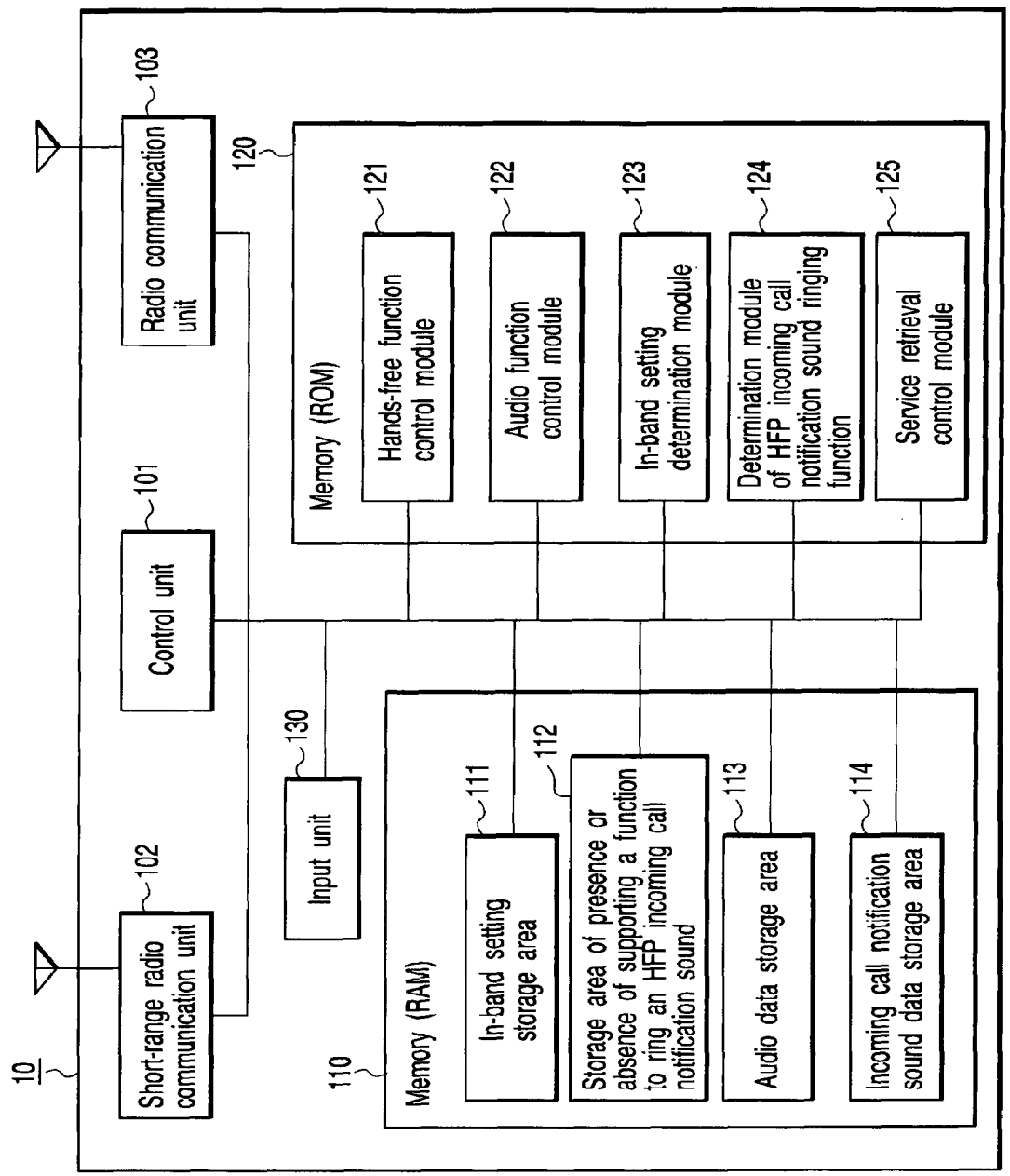
FIG. 2 is an exemplary block diagram depicting a configuration of a cellular phone regarding the embodiment of the invention (configuration related to operation control peculiar to the embodiment)

FIG. 2 is a block diagram illustrating a configuration of the cellular phone 10 regarding the invention (configuration regarding operation control peculiar to the embodiment). As shown in FIG. 2, the cellular phone 10 includes a control unit 101, a short-range radio communication unit 102, a radio communication unit 103, a RAM 110, a ROM 120, and an input means 130.

The control unit 101 performs operation control in executing each function, such as voice call data communication via the mobile network 5, and provision of a service to the headset 12 that is a counterpart device.

The short-range radio communication unit 102 performs short-range radio communication between the corresponding cellular phone 10 and the headset 12, in accordance with, e.g., the Bluetooth standard.

The radio communication unit 103 makes communication with the base station (not shown) accommodated in the mobile communication network 5 in a mobile communication system.

The RAM 110 is a memory to store a variety of items of data (details are mentioned later).

The ROM 120 is a memory to store a control program so that the control unit 101 integrally controls each unit (details are described later).

The input means 130 has a plurality of digit keys and function keys by which a user can input instructions.

Here, the RAM 110 has an in-band setting storage area 111, a storage area 112 of presence or absence of supporting a function to ring an HFP incoming call notification sound, an audio data storage area 113, and a storage area 114 of incoming call notification sound data.

The in-band setting storage area 111 stores the presence or absence of setting of a mode (in-band notification mode). If the in-band notification mode is set, the incoming call notification sound stored in the storage area 114 is transmitted to the headset 12 via a voice link defined by the HFP and the incoming call notification sound is reproduced at the headset 12.

The storage area 112 stores whether or not the function of the HFP incoming call notification sound, ringing the audio data stored in the headset 12 when the headset 12 receives the incoming call notification (RING notification) through the control link defined by the HFP, is supported by the headset 12 (determination result from a determination module 124 of HFP incoming call notification sound ringing function given below).

The audio data storage area 113 stores audio data.

The incoming call notification sound storage area 114 stores the incoming call notification sound data that is the audio data to notify the incoming call to a user.

The ROM 120 includes a hands-free function control module 121, an audio function control module 122, an in-band setting determination module 123, a determination module 124 of HFP incoming call notification sound ringing function, and a service retrieval control module 125.

The hands-free function control module 121 is a module which stores a program, etc., so that the control unit 101 controls the communication by means of the HFP to be made by using the short distance radio communication unit 102.

The audio function control module 122 is a module which stores a program, etc., so that the control unit 101 controls communication through an audio link defined by the AV profile to be performed by using the short-range radio communication unit 102.

The in-band setting determination module 123 is a module which stores a program, etc., so that the control unit 101 determines the presence or absence of the setting of the in-band notification mode.

The determination module 124 of the HFP incoming call notification sound ringing function is a module which stores a program, etc., so that the control unit 101 determines the presence or absence of the setting of the HFP incoming call notification sound ringing function.

The service retrieval control module 125 is a module which stores a program, etc., so that the control unit 101 controls the service retrieval processing to retrieve a service corresponding to the headset 12 that is the counterpart device.

Hereinafter, incoming call notification sound ringing processing defined so as not to pose a malfunction when the incoming call notification sound ringing processing by the AV profile competes with the incoming call notification sound ringing processing by the HFP between the cellular phone 10 and the headset 12 regarding the embodiment is described by referring to FIG. 3 to FIG. 6.

Figure 3:
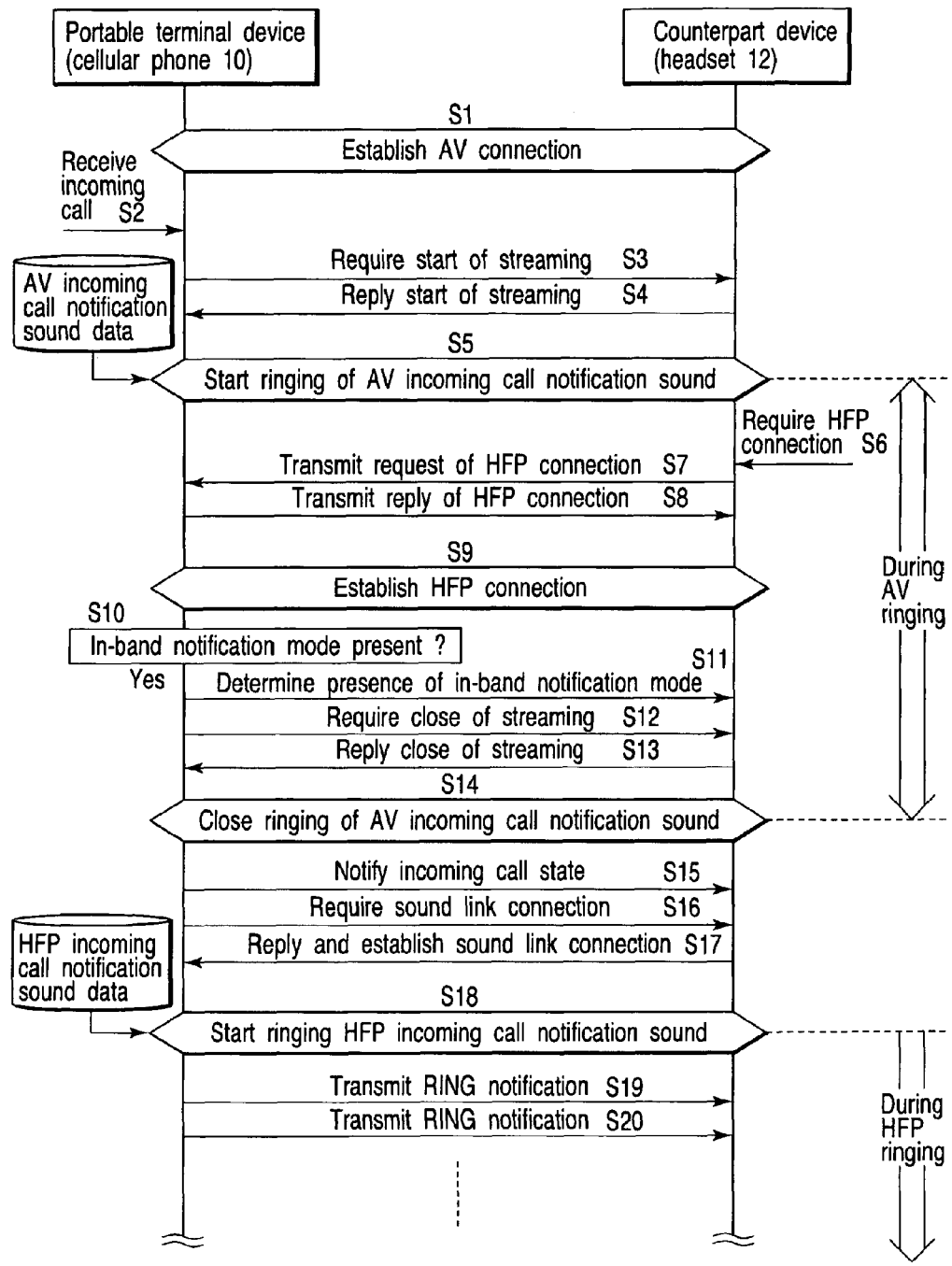
FIG. 3 is an exemplary view depicting a sequence of processing in the case of presence of setting of an in-band notification mode.
Figure 4:
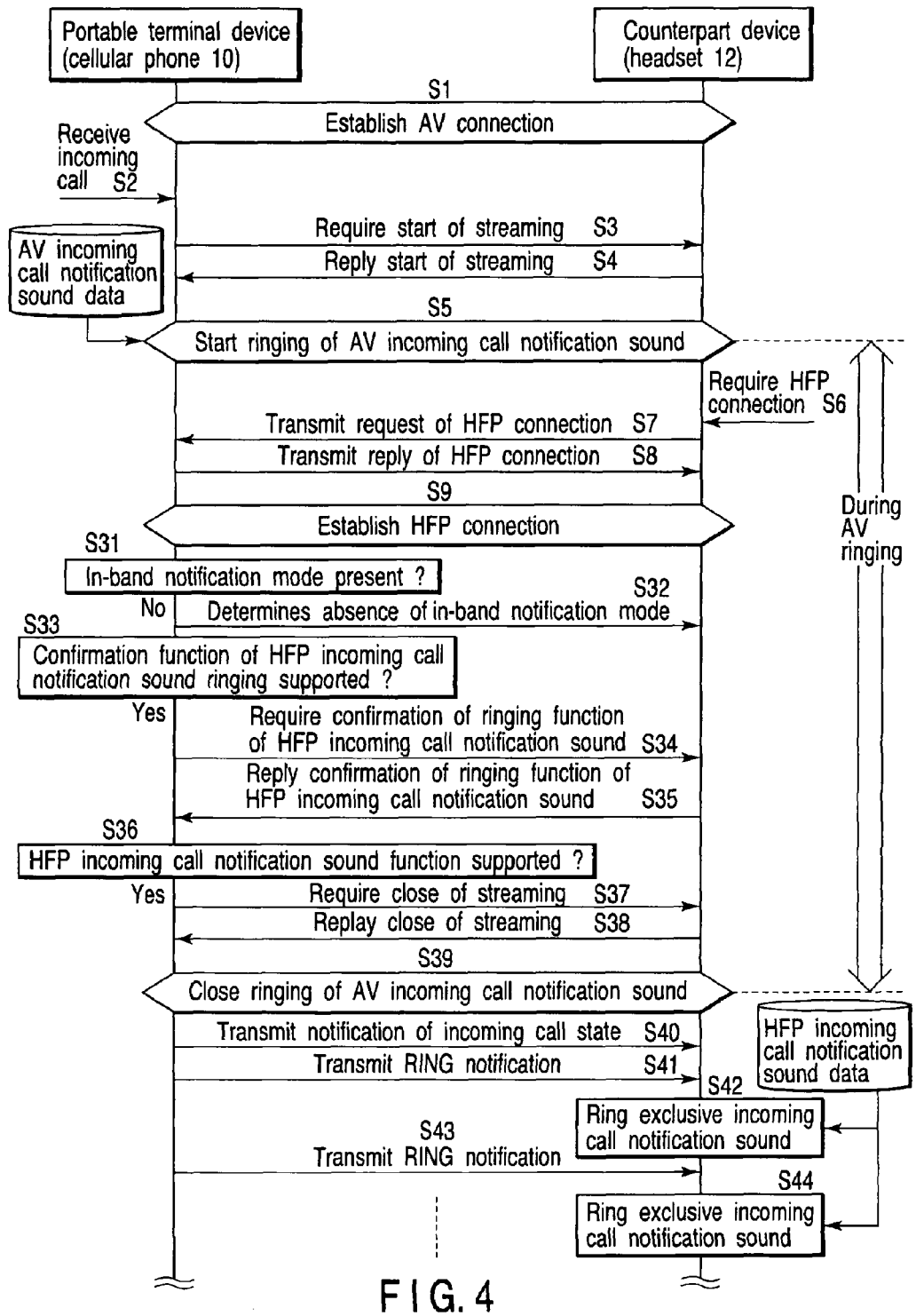
FIG. 4 is an exemplary view depicting a sequence of processing in the case of absence of setting of an in-band notification mode.
Figure 6:
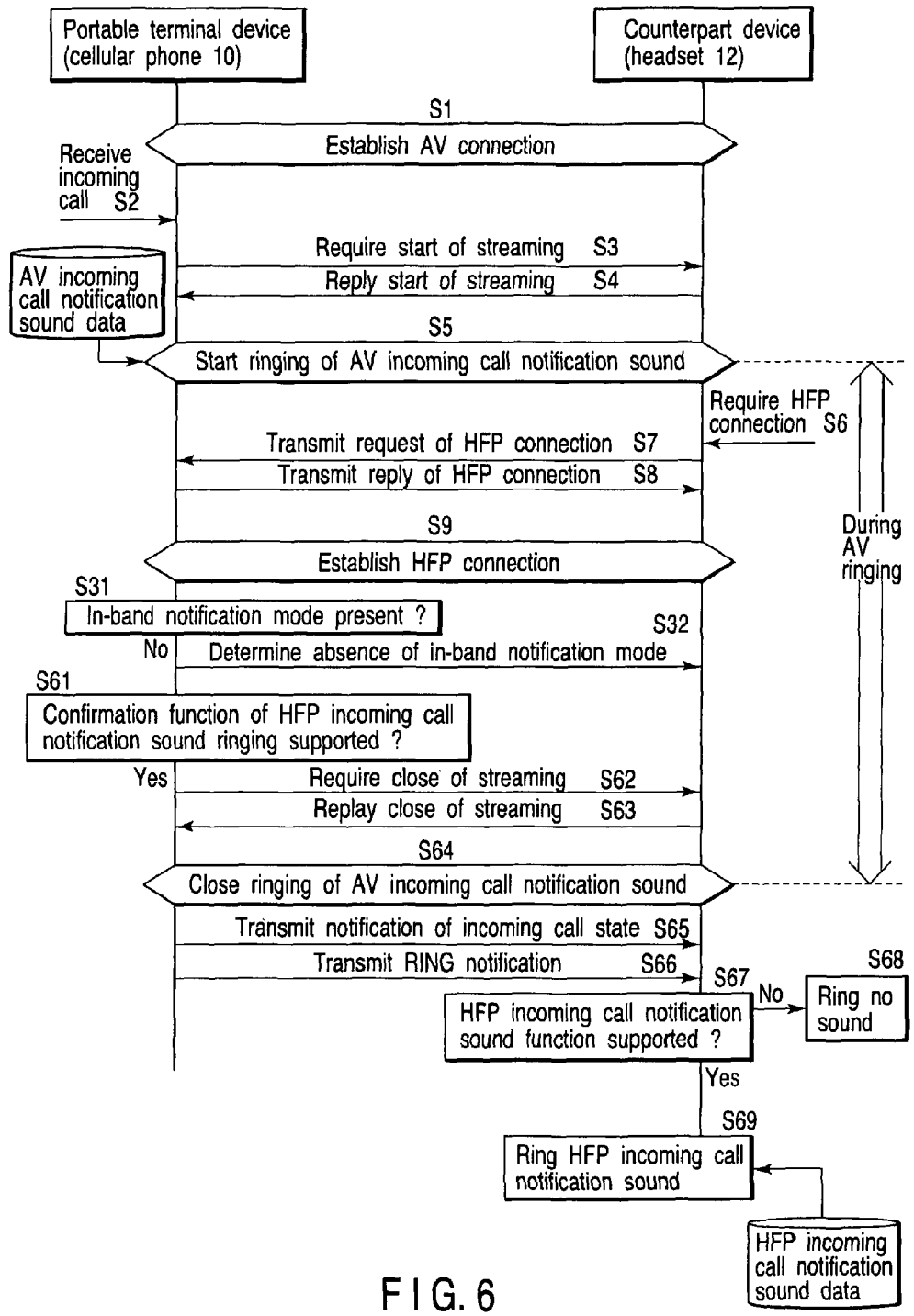
FIG. 6 is an exemplary view depicting a sequence of processing in the case in which it is not clear whether or not the function to ring the HFP incoming call notification sound is supported by the headset.

Wherein, FIG. 3 is a view showing the sequence of processing in the case of presence of setting an in-band notification mode. FIG. 4 is a view showing the sequence of processing in the case of absence of the setting the in-band notification mode. FIG. 5 is a view illustrating the sequence of processing when the HFP incoming call notification sound ringing function is not supported by the headset 12. FIG. 6 is a view showing the sequence of processing when it is not clear whether or not the HFP incoming call notification sound ringing function is supported by the headset 12.

A mobile communication is made between the cellular phone 10 and the base station. Communication according to the Bluetooth standard is performed between the cellular phone 10 and the headset 12, the control signal defined through the Bluetooth standard is used for the communication control.

In the cellular phone 10, the control unit 101 performs operation control in the communication processing mentioned below, and in the headset 12, a control unit (not shown) owned thereby performs the operation control. This will not be pointed out every time in the following description, for the sake of convenience in explanation, and only subjects of each operation control (cellular phone 10 or headset 12) will be pointed out.

Meanwhile, the cellular phone 10 has a source (SRC) function that is a function of transmitting audio data, as a function of performing processing by means of the AV profile. The cellular phone 10 also has an audio gateway (AG) function that is a function of transmitting and receiving a voice call by the use of the mobile communication network 5, as a function for conducting processing by the HFP.

Similarly, the headset 12 has a synch (SNK) function that is a function to sound the received audio data through a loudspeaker, etc., as a function of performing the processing through the AV profile. The headset 12 has an HF function that is a function to issue an outgoing request or an incoming reply of voice calling, and hands-free communication, etc., to a device having the AG function, as a function of conducting the processing by the HFP.

Therefore, the cellular phone 10 and the headset 12, in the communication processing described below, each of them conducts the processing by appropriately using each function described above.

In other words, the cellular phone 10 uses the SRC function in performing the processing by means of the AV profile, and it uses the AG function in performing the processing by means of the HFP. Likewise, the headset 12 uses the SNK function for performing the processing through the AV profile, and it uses the HF function for performing the processing through the HFP.

(Processing in Case of Presence of Setting In-band Notification Mode)

The following will explain the sequence of processing, when the in-band notification mode is set, by referring to FIG. 3.

The cellular phone 10 and the headset 12, at first, each start the AV file (for example, A2DP) to establish a session by means of the Av profile with each other (step S1). After this, the Bluetooth communication between the cellular phone 10 and the headset 12 is conducted in accordance with an AV profile procedure until a connection is established by another profile and until a change to another profile is made. Herein, it is preferable that, for example, a streaming transmission of an audio content from the cellular phone 10 to the headset 12 is performed.

After that, the cellular phone 10 waits for the arrival of the incoming call signal transmitted from the base station (not depicted). When the incoming call signal addressing the cellular phone 10 is transmitted from the base station (not depicted), the radio communication unit 103 of the cellular phone 10 detects the incoming call signal (step S2). The cellular phone 10 then transmits a request signal, for ring-starting an incoming call notification sound by the incoming call notification sound data (stored as AV incoming call notification sound data in the incoming call notification sound data storage area 114 in the RAM 110) as streaming data to be transmitted from the corresponding cellular phone 10, to the headset 12 through the AV profile procedure (step S3). The headset 12 transmits a reply signal of the fact to ring-start the incoming call notification sound by the AV incoming call notification sound as the streaming data to the cellular phone 10 when the request signal is received from the cellular phone 10 (step S4). The headset 12 then starts the ringing of the AV incoming call notification sound data in accordance with the Av profile (step S5).

Here, to perform hands-free communication by the use of the headset 12, the user conducts a prescribed operation to require the HFP connection between the cellular phone 10 and the headset 12 by means of the headset 12 (step S6). The headset 12 then starts the HFP to transmit a request signal for establishing a control link defined by the HFP to the cellular phone 10 (step S7).

When receiving the request signal transmitted in step S7, the cellular phone 10 transmits a reply signal showing the fact to establish a session by means of the HFP to the headset 2 (step S8). The processing then establishes the connection through the HFP between the cellular phone 10 and the headset 12 (step S9).

Here, the cellular phone 10 determines whether in-band notification mode has been set or not (step S10), if it is determined that the setting the in-band notification mode is present, the cellular phone 10 transmits the fact to the headset 12 (step S11). The cellular phone 10 further transmits a request signal to close ringing the AV incoming call notification sound caused by the AV incoming call notification sound data that is the streaming data (step S12). The headset 12 receives the request signal and transmits a reply signal, closing the ringing the AV incoming call notification sound through the AV incoming call notification sound data as the streaming data, to the cellular phone 10 (step S14).

After this, the cellular phone 10 transmits an incoming call state information, showing the fact of reception of the incoming call signal transmitted from the base station (not depicted), to the headset 12 (step S15). The cellular phone 10 furthermore transmits a request signal, connecting the voice link so as to make communication through the HFP by using the headset 12, to the headset 12 (step S16). The headset 12 which has received the request signal transmits a reply signal connecting the voice link to perform communication through the HFP to the cellular phone 10, and results in an establishment of a connection through the voice link between the cellular phone 10 and the headset 12 (step S17). The headset 12 then starts ringing the incoming call notification sound in the in-band notification mode (step S18). The incoming call notification sound data of the incoming call notification sound to be ring-started in step S18 has been stored as the HFP incoming call notification sound data in the incoming call notification sound data storage area 114 in the RAM 110.

As for the AV incoming call notification data and the HFP incoming call notification sound, it is preferable to mutually use incoming call notification sound identical to each other, and preferable to use incoming call notification sound data differing from each other as well.

After the headset 12 starts ringing the incoming call notification sound in step S18, the cellular phone 10 transmits a RING notification, which is a control signal to be periodically notified during the ringing of the incoming call notification sound, to the headset 12 (step 19, step S20).

(Processing in Case of Absence of Setting In-band Notification Mode)

Referring next to a sequence of processing in the case that there is no setting of the in-band notification mode shown in FIG. 4, the processing in the case of presence of the setting of the forgoing in-band notification mode is same as that from step S1 to S9. Therefore, hereinafter, the processing from step S31 to S39 that is a peculiar processing to that in the case of absence of the setting of the in-band notification mode.

In step S9, after the establishment of the connection through the HFP between the cellular phone 10 and the headset 12, the cellular phone 10 determines whether or not the setting of the in-band notification mode is present (step S31), if it determines the absence thereof, it transmits the fact to the headset 12 (step S32).

Next to this, the cellular phone 10 determines whether or not it has a function to confirm, whether or not the HFP incoming call notification sound function is supported, to the headset 12 (step S33). If it is determined that the cellular phone 10 has the confirmation function, it transmits a reply signal, indicating a signal to confirmation-request whether or not the HFP incoming call notification sound ringing function is supported, to the headset 12 (step S34). The headset 12 which has received the signal transmits a reply signal, indicating the presence or absence of the support of the ringing function (here it is presumed that function is supported), to the cellular phone 10 (step S35).

The cellular phone 10 determines that the headset 12 supports the HFP incoming call notification sound ringing function in accordance with the reply signal transmitted in step S35 (step S36). The cellular phone 10 then transmits a request signal as streaming data to close ringing the AV incoming call notification sound by the AV incoming call notification sound data (step S37). The headset 12 receives this request signal and transmits a replay signal to close ringing the AV incoming call notification sound by the AV incoming call notification sound data as the streaming data to the cellular phone 10 (step S38). Then, the ringing of the incoming call notification sound at the headset 12 is closed (step S39).

After this, the cellular phone 10 transmits an incoming call state notification, showing that reception of the incoming call signal transmitted from the base station has been made, to the headset 12 (step S40). The cellular phone 10 transmits a RING notification, which is a control signal to be periodically notified, to the headset 12 (step S41). The headset 12 which has received the RING notification rings the HFP incoming call notification sound through the HFP incoming call notification sound data stored in a storage unit (not shown) in the relevant headset 12 by means of the HFP incoming call notification sound ringing function (step S42). After that, the transmission of the RING notification from the cellular phone 10 to the headset 12 (step S43) and the transmission of the ringing of the HFP incoming call notification sound at the headset 12 (step S44) are mutually repeated in turn.

(Processing in the Case Where HFP Incoming Call Notification Sound Ringing Function is not supported by Headset 12)

The following will describe a sequence of processing in the case in which the HFP incoming call notification sound ringing function is not supported by the headset 12 with reference to FIG. 5. In this case, the processing in the case of absence of the setting of the forgoing in-band notification mode goes the same as the processing from step S1 to S34. Therefore, the processing from step S51 to S55 that are peculiar in the case in which the HFP incoming call notification sound is not supported by the headset 12 will be described below.

The headset 12 which has received a confirmation request signal transmitted from the cellular phone 10 in step S34 transmits a replay signal, showing the presence or absence of the HFP incoming call notification sound ringing function (wherein, it is supposed that the headset 12 does not support the HFP incoming call notification sound ringing function), to the cellular hone 10 (step S51).

The cellular phone 10 determines that the headset 12 does not support the HFP incoming call notification sound ringing function in accordance with the reply signal transmitted in step S51 (step S52). In succession, the cellular phone 10 transmits the incoming call state notification, indicating that it has received the incoming call notification signal transmitted from the base station (not depicted), to the headset 12 (step S53). The cellular phone 10 transmits the RING notification that is the periodically notified control signal to the headset 12 (step S54). After this, the cellular phone 10 periodically transmits the RING notification 10 to the headset 12 (step S55).

In other words, if the in-band notification mode is not set in the cellular phone 10, and if the HFP incoming call notification sound is not supported in the headset 12, the ringing of the AV incoming call notification sound which has been started in step S5 is continued.

(Processing When it is not Clear Whether or not Incoming Call Notification Sound Ringing Function is Supported in Headset 12)

Next, the sequence in the processing when it is not clear whether or not the headset 12 supports the HFP incoming call notification sound ringing function will be explained by referring to FIG. 6. In such a case, the processing in the case in which the headset 12 does not support the HFP incoming call notification sound ringing function goes the same as that from step S1 to S32. Accordingly, the processing from step 861 to 869 that is the peculiar processing in the case in which it is not clear whether or not the headset 12 supports the ringing function will be described herein.

After ending the processing in step S32, the cellular phone 10 determines whether or not the relevant cellular phone 10 has the function to confirm whether or not the headset 12 supports the HFP incoming call notification sound ringing function to the headset 12 (here, the cellular phone 10 does not have) (step S61).

The cellular phone 10 then transmits the request signal, which closes the ringing of the AV incoming call notification sound by the AV incoming call notification sound data as the streaming data which has been started in step S5, to the headset 12 (step S62). The headset 12 receives this request signal and transmits the reply signal, indicating the fact to close the ringing of the AV incoming call notification sound by the AV incoming call notification sound data as the streaming data, to the cellular phone 10 (step S63). The headset 12 then closes ringing the incoming call notification sound (step S64).

The cellular phone 10, in succession, transmits the incoming call state notification, indicating the fact of the reception of the incoming call signal transmitted from the base station, to the headset 12 (step S65). The cellular phone 10 transmits the RING notification that is the periodically notified control signal to the headset 12 (step S66).

Here, if the headset 12 does not support the HFP incoming call notification sound ringing function, the headset 12 does not sounds any incoming call notification sound after this (step S68). On the contrary, if the headset 12 supports the ringing function, the headset 12 sounds the HFP incoming call notification sound by the HFP incoming call notification sound ringing function, namely the HFP incoming call notification sound by the HFP incoming call notification sound data stored in the storage unit (not shown) in the relevant headset 12 in response to the RING notification transmitted from the cellular phone 10 to the headset 12 (step S69).

As mentioned above, according to the embodiment, a portable terminal device defining an optimum incoming call notification sound ringing process may be provided so as not to pose malfunction in the case in which the incoming call notification sound ringing processing through the AV profile competes with the incoming call notification sound ringing processing through the HFP processing when the portable terminal, such as a cellular phone, and the external remote device, such as a headset, are connected to each other via a radio line.

In other words, according to the portable terminal regarding the embodiment, if the incoming call notification sound ringing processing by the AV profile competes with that by the HFP, since it performs the optimum incoming call notification sound ringing processing which is defined in advance, the malfunction does not occur.

Having described the present invention on the basis of the embodiment, the invention is not limited to the embodiment mentioned above.

(Modification)

For instance, the aforementioned embodiment determines whether or not the relevant cellular phone 10 has the function to confirm to the headset 12 whether or not the HFP incoming call notification sound ringing function is supported by the cellular phone 10, and the confirmation processing whether or not the headset 12 supports the HFP incoming call notification sound ringing function, after the competition between the connection through the AV profile and the connection through the HFP.

However, it may be of course preferable to perform such processing at the time before the connection through the AV profile competes with that through the HFP, namely at the timing of the service retrieval, of the service level connection setup, or the like in the HFP connection.

Figure 7:
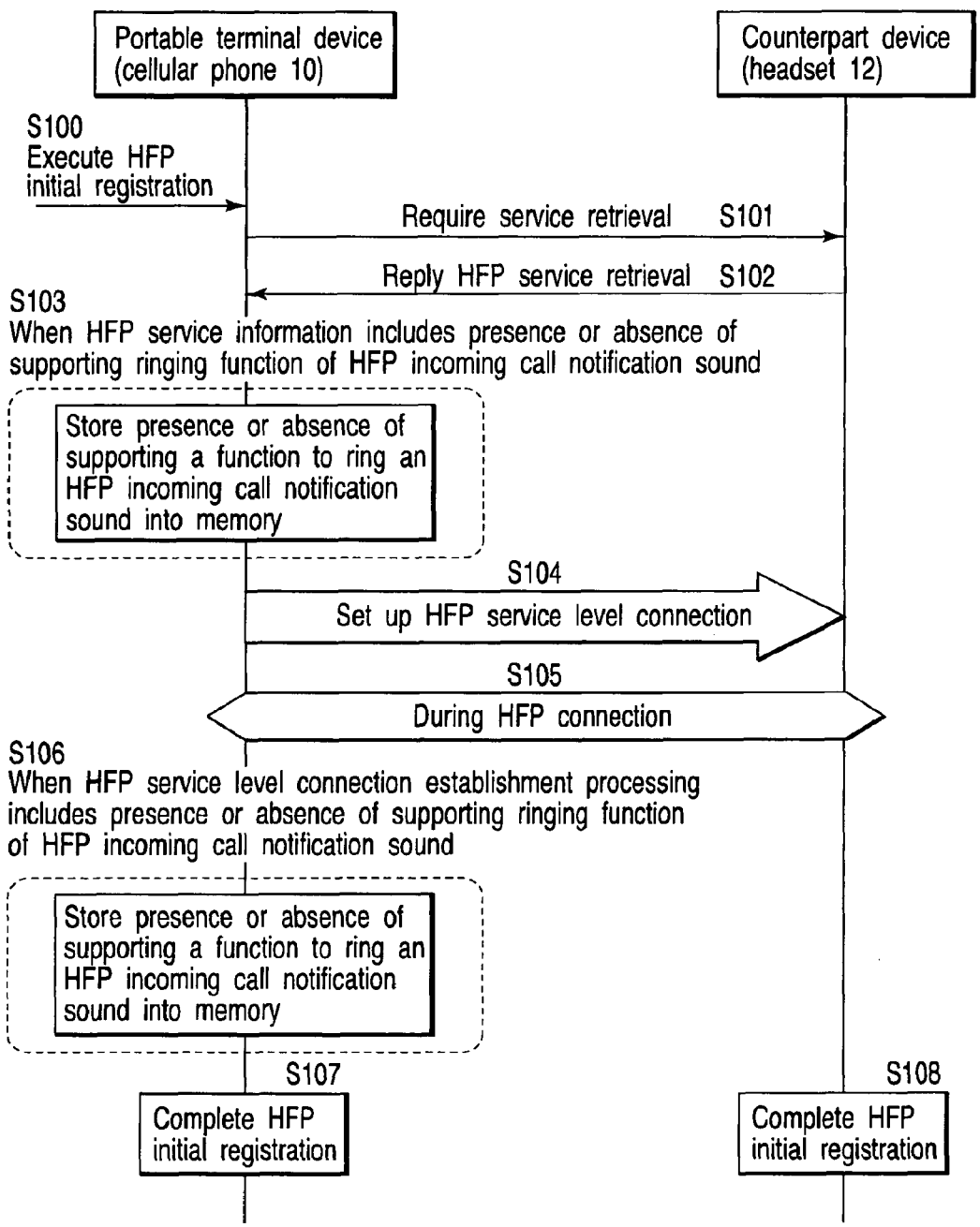
FIG. 7 is an exemplary view depicting a sequence in the case in which it is determined whether or not the corresponding cellular phone has a function to confirm whether or not the function to ring the HFP incoming call notification sound is supported to the headset, and the case in which it is confirmed whether or not the headset has the function to ring the HFP incoming call notification sound in service retrieval for performing an HFP connection.

Referring now to FIG. 7, the following will explain the processing in the case in which the cellular phone 10 conducts the confirmation processing whether or not the headset 12 supports the HFP incoming call notification sound ringing function at the time of the service retrieval for connecting through the HFP.

A user firstly operates the cellular phone 10 to carry out HFP initial registration therein (step S100), then, the cellular phone 10 transmits a request signal for service retrieval processing to retrieve the corresponding service to the headset 12 (step S101). The headset 12 which has received the request signal conducts the service retrieval processing and transmits a reply signal telling the result thereof to the cellular phone 10 (step S102).

If any information showing the presence or absence of the support of the HFP incoming call notification sound ringing function is included as HFP service information in the reply signal transmitted from the headset 12 in step S102, the cellular phone 10 stores the presence or absence of the relevant support in the storage area 112 of the presence or absence of supporting the function to ring the HFP incoming call notification sound in the RAM 110 (step S103).

The cellular phone 10 then carries out HFP service level connection setup for the headset 12 (step S104). The HFP connection is established between the cellular phone 10 and the headset 12 (step S105).

Furthermore, when acquiring the information indicating the presence or absence of the support of the HFP incoming call notification sound ringing function in the setup processing of the HFP service level connection in step S104, the cellular phone 10 stores the presence or absence of the corresponding support in the storage area 112 of the RAM 110 (step S106). The cellular phone 10 and the headset 12 then completes the HFP initial registration (step S107, step S108).

While the aforementioned embodiment has been assumed the case where the HFP connection request is issued from the side of the headset 12 when the connection through the AV profile is established, it is of course that the foregoing embodiment is applicable in the case in which the HFP connection request is issued from the cellular phone 10.

Figure 8A:
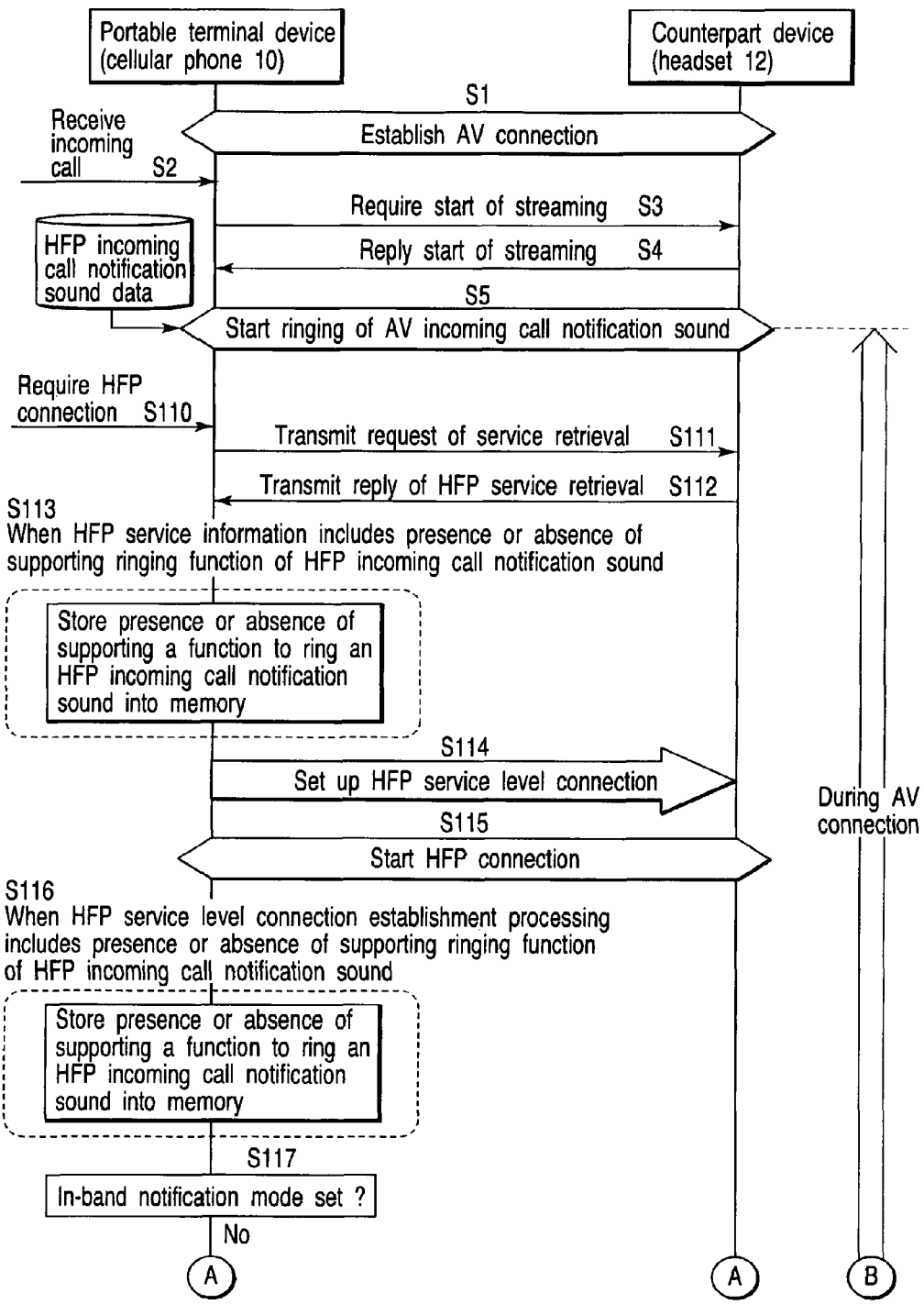
FIG. 8A is an exemplary view depicting a first part of a sequence of processing in the case in which an HFP connection request is made from a cellular phone side when a connection through an AV file is established.
Figure 8B:
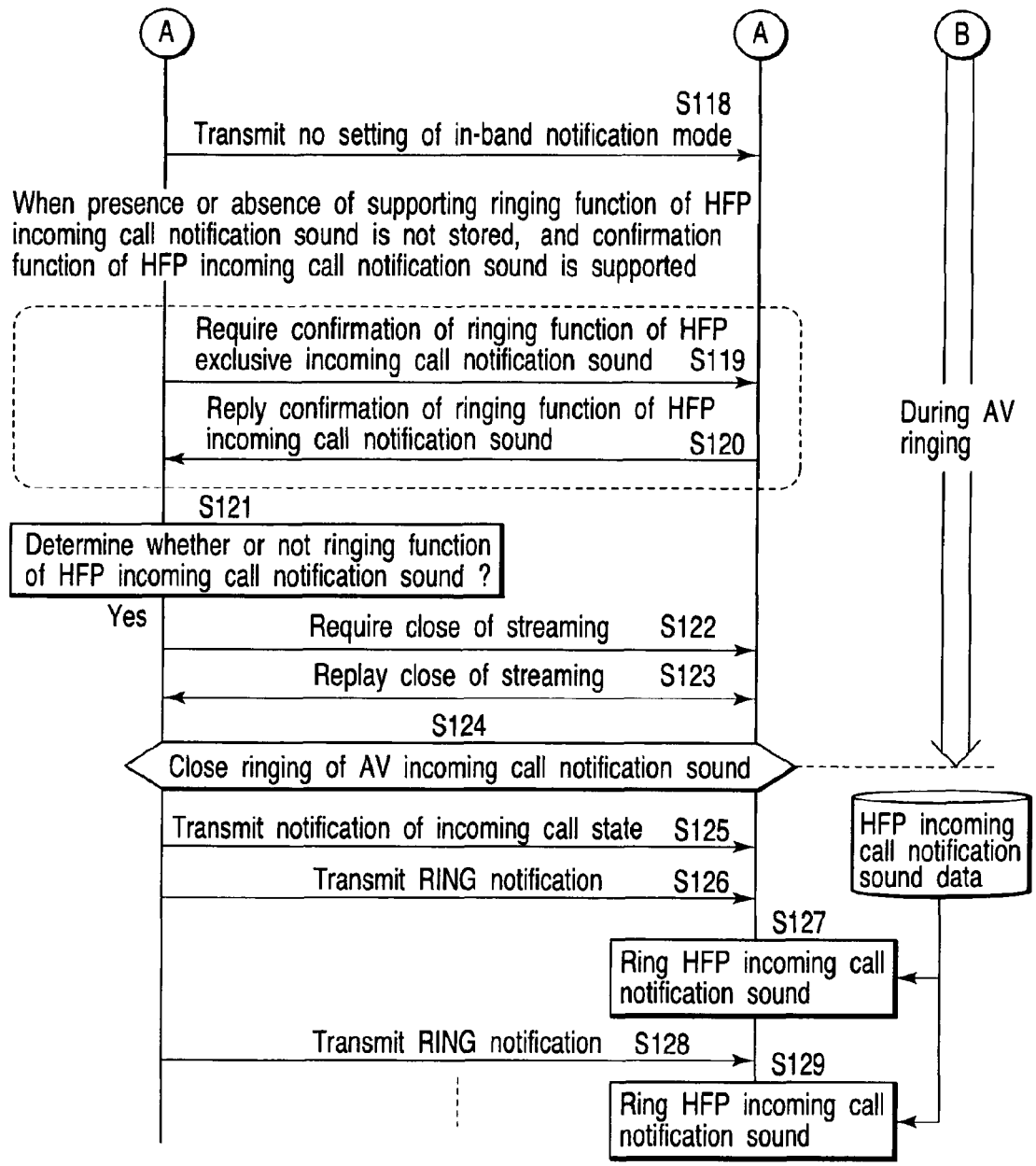
FIG. 8B is an exemplary view depicting a second part of the sequence of the processing in the case in which the HFP connection request is made from the cellular phone side when the connection through the AV file is established.

Hereinafter, an example of processing for issuing an HFP connection request from the side of the cellular phone 10 when the connection through the AV profile is established with reference to FIG. 8A and FIG. 8B.

In this case, as to the steps from step S1 to S5, the same goes as the processing in the case of presence of the setting of the in-band notification mode given above. Therefore, the processing from step S110 to S129 that is peculiar to the case in which the HFP connection request is issued from the cellular phone side when the connection by the AV profile is established will be described hereinafter.

After the processing in step S5, to perform hands-free communication by using the headset 12, the user conducts a prescribed operation, at the cellular phone 10, to require the HFP connection between the cellular phone 10 and the headset 12 (step S110).

The relevant cellular phone 10 transmits a request signal for service retrieval processing to retrieve the corresponding service to the headset 12 (step S111). The headset 12 which has received the request signal conducts the service retrieval processing and transmits a reply signal indicating the result from the service retrieval processing to the cellular phone 10 (step S112).

If the information showing the presence or absence of the support for the HFP incoming call notification sound ringing function is included as the HFP service information in the reply signal transmitted from the headset 12 in step S112, the cellular phone 10 stores the presence or absence of the support into the storage area 112 of the RAM 110 (step S113).

Subsequently, the cellular phone 10 carries out the HFP service level connection setup to the headset 12 (step S114). The HFP connection is established between the cellular phone 10 and the headset 12 (step S115).

Moreover, in setup processing of the HFP service level connection in step S114, when receiving the information indicating the presence or absence of the support of the HFP incoming call notification sound ringing function, the cellular phone 10 stores the presence or absence of the relevant support into the storage area 112 of the RAM 110 (step S116).

The cellular phone 10, in succession, determines whether or not the setting of the in-band mode notification is set therein (step S117), and if it determines the absence of the setting thereof, it transmits the fact to the headset 12 (step S118).

Here, if the cellular phone 10 has a function to confirm whether the HFP incoming call notification sound ringing function is supported or not to the headset 12, and when the presence or absence of the support is not stored in the storage area 112 of the RAM 110, the cellular phone 10 transmits a signal, requiring the confirmation whether or not the HFP incoming call notification sound ringing function is supported, to the headset 12 (step S119). When receiving the signal, the headset 12 transmits a reply signal, telling the presence or absence of the support of the HFP incoming call notification sound ringing function (here, it is presumed that the support is present), to the cellular phone 10 (step S120).

The cellular phone 10 determines that the headset 12 supports the ringing function of the HFP incoming call notification sound from the reply signal transmitted from the headset 12 in step S120 (step S121). The cellular phone 10 then transmits a request signal to close the ringing of the AV incoming call notification sound through the AV incoming call notification sound data as the streaming data to the headset 12 (step S122). The headset 12 receives the request signal and transmits the reply signal of the fact, which closes the ringing of the AV incoming call notification sound through the AV incoming call notification sound data as the streaming data, to the cellular phone 10 (step S123). Then, the ringing of the incoming call notification sound at the headset 12 comes to an end (step S124).

Subsequently, the cellular phone 10 transmits an incoming call state notification showing the fact of reception of the incoming call signal transmitted from the base station (not depicted) to the headset 12 (step S125). After this, the cellular phone 10 transmits the RING notification, which is a control signal to be periodically notified, to the headset 12 (step S126).

On the other hand, the headset 12 which has received the RING notification rings the HFP incoming call notification sound, namely the sound by the HFP incoming call notification sound data stored in the storage unit of the headset 12 (step S127). After that, the transmissions of the RING notification from the cellular phone 10 to the headset 12 (step S128) and of the ringing of the HFP incoming call notification sounds at the headset 12 (step S129) are mutually repeated in turn.

Further, the aforementioned embodiments include inventions in a variety of stages; an appropriate combination of a plurality of disclosed constituent conditions may extract a variety of inventions. For example, even if some of the constituent conditions are deleted from all constituent conditions shown in the embodiments, if the problems described in the column of the subject to be solved by the invention can be solved, and if the effects described in the column of the can be obtained, the constitution from which the constituent conditions are eliminated may be extracted as the invention.

What is claimed is:

1. A portable terminal, comprising:
   a short-range radio communication unit to communication with a remote device via a radio link directly;
   a storage unit to store sound data for notifying that an incoming call is received;
   a hands-free control unit to control a control link and a voice link with the remote device;
   an audio control unit to control an audio link with the remote device;
   an in-band setting determination unit to determine whether an in-band notification mode, which
   designates that the sound data is transmitted via
   the voice link to the remote device when an incoming call is received, is valid; and
   a determination unit to determine whether or not the remote device is capable of ringing based on second sound data stored in the remote device responding to an incoming call,
   wherein, by the hands-free control and the audio control unit compete for transmitting the sound data to the remove device, the in-band setting determination unit determines that the in-band notification mode is valid, and the determination unit determines that the remote device is incapable of ringing; and
   wherein the audio control unit transmits the sound data to the remote device.

2. The portable terminal according to claim 1, wherein the in-band setting determination unit determines whether the in-band notification mode is valid when the hands-free control unit establishes the control link with the remote device.

3. The portable terminal according to claim 1, wherein the in-band setting determination unit determines whether the in-band notification mode is valid when an incoming call is received when the audio control unit is transmitting an audio content to the remote device via the audio link.

4. The portable terminal according to claim 1, further comprising:
   a retrieving control unit to retrieve first information on whether the remote device is capable of ringing based on the sound data;
   a second storage unit to store the first information retrieved by the retrieving control unit and second information, which is detected during the hands-free control unit setting up the control link, on whether the remote device is capable of ringing based the sound data; and
   the determination unit determines that the remote device is capable of ringing based on the sound data based on the first and second information.

5. A portable terminal, comprising:
   a short-range radio communication unit to communicate with a remote device via a radio link directly;
   a storage unit to store sound data for notifying that an incoming call is received;
   a hands-free control unit to control a control link and a voice link with the remote device via the short-range radio communication unit;
   an audio control unit to control an audio link with the remote device; and
   an in-band setting determination unit to determine whether an in-band notification mode, which designates that the sound data is transmitted via the voice link to the remote device when an incoming call is received, is valid,
   wherein, when the hands-free control unit and the audio control unit compete, and the in-band setting determination unit determines that the in-band notification mode is valid,
   the hands-free control unit controls the remote device to ring based on sound data stored in the remote device.

6. The portable terminal according to claim 5, wherein the in-band setting determination unit determines whether the in-band notification mode is valid when the hands-free control unit establishes the control link with the remote device.

7. The portable terminal according to claim 5, wherein the in-band setting determination unit determines whether the in-band notification mode is valid when an incoming call is received when the audio control unit is transmitting an audio content to the remote device via the audio link.

* * * * *

UNITED STATES PATENT AND TRADEMARK OFFICE
CERTIFICATE OF CORRECTION

PATENT NO. : 8,103,315 B2  
APPLICATION NO. : 12/986682  
DATED : January 24, 2012  
INVENTOR(S) : Tanada et al.

Page 1 of 1

It is certified that error appears in the above-identified patent and that said Letters Patent is hereby corrected as shown below:

On the Title Page, in Field (73), under "Assignee", in Column 1, Line 1, delete "Fuijtsu Toshiba Mobile Communications Limited" and insert -- Fujitsu Toshiba Mobile Communications Limited --, therefor.

Signed and Sealed this  
Fourth Day of September, 2012

David J. Kappos  
*Director of the United States Patent and Trademark Office*